United States Patent
Klemm et al.

(10) Patent No.: US 9,798,500 B2
(45) Date of Patent: Oct. 24, 2017

(54) SYSTEMS AND METHODS FOR DATA STORAGE TIERING

(71) Applicant: Dell Products L.P., Round Rock, TX (US)

(72) Inventors: Michael J. Klemm, Minnetonka, MN (US); Anthony Floeder, St. Anthony, MN (US)

(73) Assignee: Dell Products L.P., Round Rock, TX (US)

( * ) Notice: Subject to any disclaimer, the term of this patent is extended or adjusted under 35 U.S.C. 154(b) by 189 days.

(21) Appl. No.: 14/940,890

(22) Filed: Nov. 13, 2015

(65) Prior Publication Data

US 2017/0139651 A1    May 18, 2017

(51) Int. Cl.
*G06F 12/00*    (2006.01)
*G06F 3/06*    (2006.01)

(52) U.S. Cl.
CPC ............ *G06F 3/0689* (2013.01); *G06F 3/061* (2013.01); *G06F 3/0619* (2013.01); *G06F 3/0631* (2013.01); *G06F 3/0634* (2013.01)

(58) Field of Classification Search
None
See application file for complete search history.

(56) References Cited

U.S. PATENT DOCUMENTS

| 9,354,912 B1* | 5/2016 | Aron ................... G06F 9/45558 |
| 2015/0199138 A1* | 7/2015 | Ramachandran ..... G06F 12/122 |
| | | 711/103 |

* cited by examiner

*Primary Examiner* — John A Lane
(74) *Attorney, Agent, or Firm* — Jackson Walker L.L.P.

(57) ABSTRACT

In accordance with embodiments of the present disclosure, a method may include allocating to a higher-tier uniform distribution space an approximately equal capacity from each of a collection of physical disks of a common storage tier, wherein a tier of a physical disk indicates an importance of data to be stored on the physical disk and allocating to a lower-tier cold track space any portions of the physical disks not allocated to the higher-tier uniform distribution space.

9 Claims, 4 Drawing Sheets

SYSTEMS AND METHODS FOR DATA STORAGE TIERING

TECHNICAL FIELD

The present invention generally relates to a disk drive system and method, and more particularly to systems and methods for data storage tiering for allocation of data in differently-sized disks.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In this regard, RAID, an acronym for Redundant Array of Independent Disks, is a technology that provides increased storage functions and increased reliability through redundancy, and as such may be beneficially employed in information handling systems. Redundancy in a RAID device may be achieved by combining multiple disk drive components, which may include one or more disks of different type, size, or classification, into a logical unit, where data is distributed across the drives in one of several ways called "RAID levels." The data distribution determines the RAID type, e.g., RAID 0, RAID 5, RAID 10, etc.

RAID includes data storage schemes that can divide and replicate data among multiple physical disk drives. The physical disks are said to be in a RAID array, which is addressed by the operating system as one single disk. Many different schemes or architectures of RAID devices are known to those having ordinary skill in the art. Each different architecture or scheme may provide a different balance among various goals to be achieved in storing data, which include, but are not limited to, increased data reliability and increased input/output (hereinafter "I/O") performance. Furthermore, RAID devices may be grouped into one or more "tiers," where data of higher importance (e.g., higher priority data, more-often accessed data, etc.) may be stored in higher performance RAID tiers, and data of lower importance (e.g., lower priority data, least-often accessed data, etc.) may be stored in lower performance RAID tiers.

SUMMARY

In accordance with the teachings of the present disclosure, the disadvantages and problems associated with existing approaches to data storage may be substantially reduced or eliminated.

In accordance with embodiments of the present disclosure, a method may include allocating to a higher-tier uniform distribution space an approximately equal capacity from each of a collection of physical disks of a common storage tier, wherein a tier of a physical disk indicates an importance of data to be stored on the physical disk and allocating to a lower-tier cold track space any portions of the physical disks not allocated to the higher-tier uniform distribution space.

In accordance with these and other embodiments of the present disclosure, a disk drive system may include a RAID subsystem comprising a pool of storage and a disk manager having at least one disk storage system controller configured to allocate to a higher-tier uniform distribution space an approximately equal capacity from each of a collection of physical disks of a common storage tier, wherein a tier of a physical disk indicates an importance of data to be stored on the physical disk and allocate to a lower-tier cold track space any portions of the physical disks not allocated to the higher-tier uniform distribution space.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to allocate to a higher-tier uniform distribution space an approximately equal capacity from each of a collection of physical disks of a common storage tier, wherein a tier of a physical disk indicates an importance of data to be stored on the physical disk and allocate to a lower-tier cold track space any portions of the physical disks not allocated to the higher-tier uniform distribution space.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
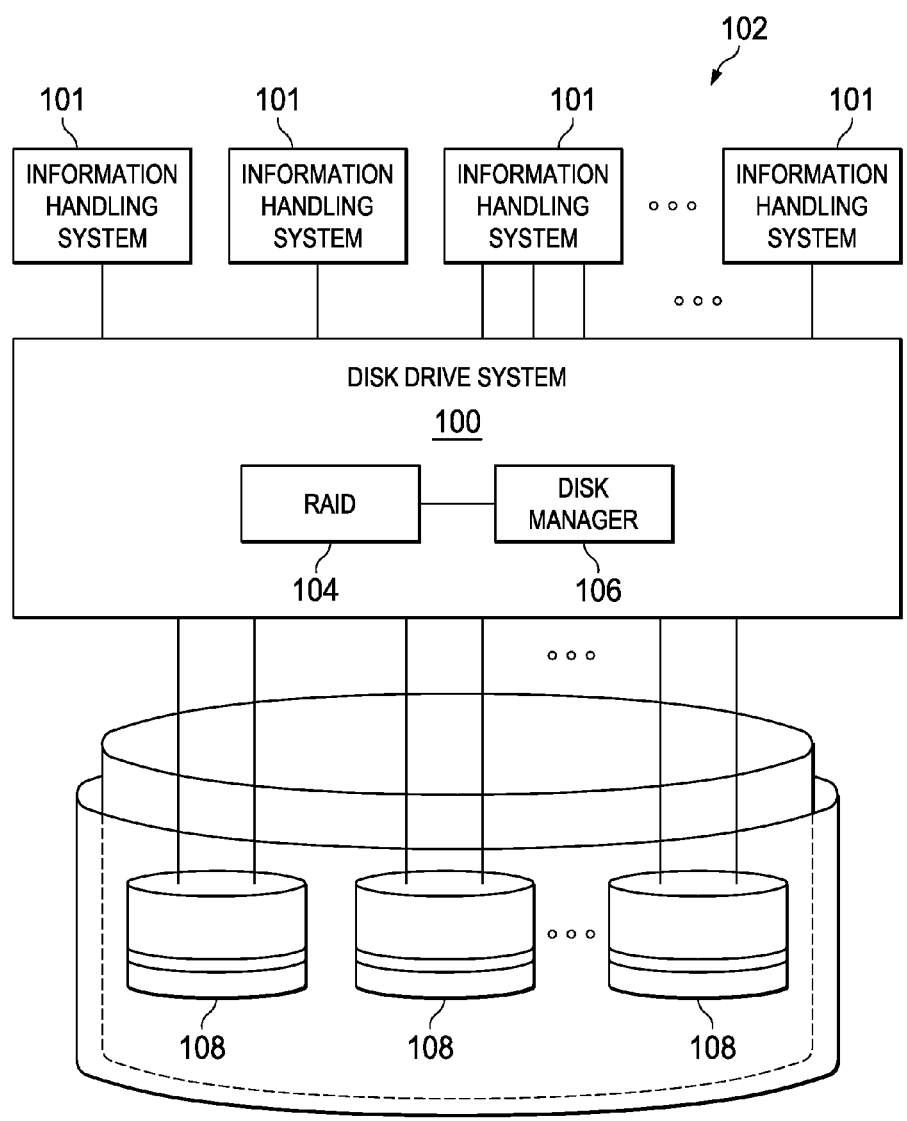
FIG. 1 illustrates a block diagram of an example disk drive system in an information handling system, in accordance with the embodiments of the present disclosure.

FIG. 1 illustrates a block diagram of an example disk drive system 100 in an information handling system environment 102, in accordance with embodiments of the present disclosure. As shown in FIG. 1, environment 102 may include one or more information handling systems 101 communicatively coupled to disk drive system 100. In some embodiments, an information handling system 101 may comprise a personal computer. In some embodiments, information handling system 101 may comprise or be an integral part of a server. In other embodiments, an information handling system 101 may comprise a portable information handling system (e.g., a laptop, notebook, tablet, handheld, smart phone, personal digital assistant, etc.).

As shown in FIG. 1, disk drive system 100 may include a RAID subsystem 104 and a disk manager 106 having at least one disk storage system controller. Disk manager 106, as shown in FIG. 1, may generally manage disks and disk arrays, including grouping/resource pooling, abstraction of disk attributes, formatting, addition/subtraction of disks, and tracking of disk service times and error rates. Disk manager 106 may not distinguish the differences between various models of disks and presents a generic storage device for the RAID component. Disk manager 106 may also provide grouping capabilities which facilitate the construction of RAID groups with specific characteristics such as 10,000 RPM disks, etc.

Thus, in embodiments of the present disclosure, the function of disk manager 106 may be at least three-fold: abstraction, configuration, and input/output (I/O) optimization. Disk manager 106 may present "disks" to upper layers which could be, for example, locally or remotely attached physical disk drives, or remotely attached disk systems. The common underlying characteristic is that any of these physical storage devices (e.g., disk drives 108) could be the target of I/O operations. The abstraction service of disk manager 106 may thus provide a uniform data path interface for the upper layers, particularly the RAID subsystem, and/or may provide a generic mechanism for the administrator to manage target devices (e.g., disk drives 108).

Disk manager 106 may also provide disk grouping capabilities to simplify administration and configuration. Disks can be named, and placed into groups, which can also be named. Grouping may be a powerful feature which simplifies tasks such as migrating volumes from one group of disks to another, dedicating a group of disks to a particular function, specifying a group of disks as spares, etc.

Disk manager 106 may also interface with devices, such as a Small Computer System Interface (SCSI) device subsystem which may be responsible for detecting the presence of external storage devices. Such a SCSI device subsystem may be capable, at least for Fibre Channel/SCSI/Serial-Attached SCSI (SAS) type devices, of determining a subset of devices which are block-type target storage devices. It is these devices which may be managed and abstracted by disk manager 106. In addition, disk manager 106 may be responsible for responding to flow control from a SCSI device layer. Accordingly, disk manager 106 may have queuing capabilities, which may present the opportunity to aggregate I/O requests as a method to optimize the throughput of disk drive system 100.

Furthermore, disk manager 106 may manage one or more disk storage system controllers. In some embodiments, a plurality of redundant disk storage system controllers may be implemented to cover the failure of an operated disk storage system controller. Redundant disk storage system controllers may also be managed by disk manager 106.

Disk manager 106 may interact with several other subsystems. For example, RAID subsystem 104 may be the major client of the services provided by disk manager 106 for data path activities. RAID subsystem 104 may use disk manager 106 as an exclusive path to disks 108 for I/O. RAID system 104 may also listen for events from disk manager 106 to determine the presence and operational status of disks 108. RAID subsystem 104 may also interact with disk manager 106 to allocate extents for the construction of RAID devices. In some embodiments of the present disclosure, RAID subsystem 104 may include a combination of at least one of RAID types, such as RAID-0, RAID-1, RAID-5, and RAID-10. It will be appreciated that other RAID types can be used in alternative RAID subsystems, such as RAID-3, RAID-4, RAID-6, and RAID-7, etc.

Disk manager 106 may also utilize services of the SCSI device layer to learn of the existence and operational status of block devices, and may have an I/O path to these block devices. Disk manager 106 may query the SCSI device subsystem about devices as a supporting method to uniquely identify disks.

In operation, RAID subsystem 104 and disk manager 106 may dynamically allocate data across disk space of a plurality of disk drives 108 based on RAID-to-disk mapping. In addition, RAID subsystem 104 and disk manager 106 may be capable of determining whether additional disk drives are required based on the data allocation across disk space. If the additional disk drives are required, a notification may be sent to a user so that additional disk space may be added if desired.

Figure 2:
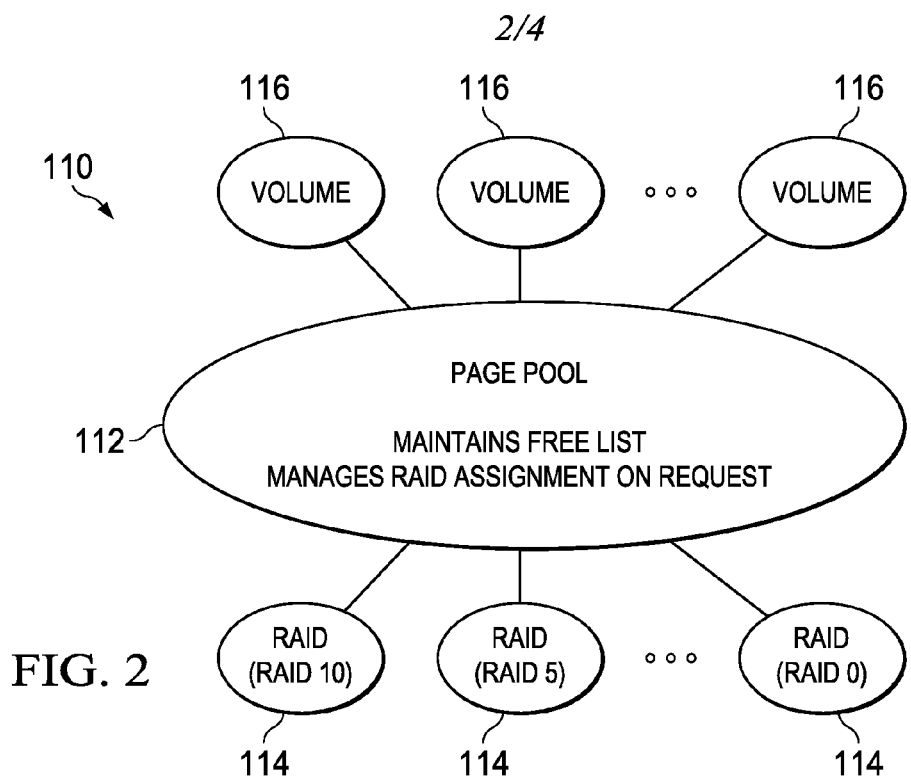
FIG. 2 illustrates a block diagram of an example dynamic data allocation having a page pool of storage for a RAID, in accordance with the embodiments of the present disclosure.

Disk drive system 100 may have a dynamic data allocation (referred to "disk drive virtualization") in accordance with the present disclosure. FIG. 2 illustrates a block diagram of an example dynamic data allocation having a page pool 112 of storage for a RAID, in accordance with the embodiments of the present disclosure. As shown in FIG. 2, disk storage system 110 may include a page pool of storage 112, e.g., a pool of data storage including a list of data storage space that is free to store data. Page pool 112 may maintain a free list of RAID devices 114 and may manage read/write assignments based on user's requests. User's requested data storage volumes 116 may be sent to the page pool 112 in order to obtain storage space response to such requests. Each volume 116 may request same or different classes of storage devices with same or different RAID levels, e.g., RAID 10, RAID 5, RAID 0, etc.

Figures 3A, 3B:
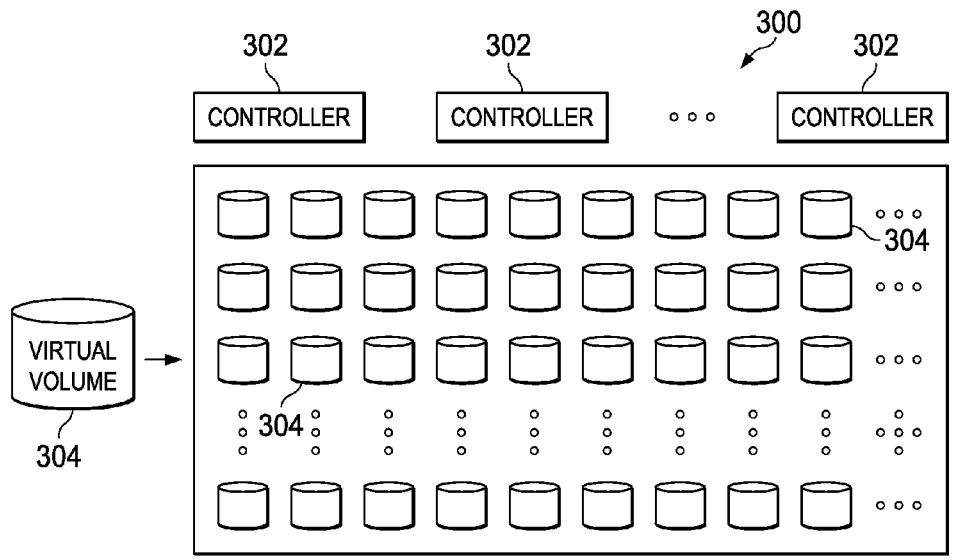
FIG. 3A illustrates a block diagram of an example disk drive system having a virtual volume matrix of disk storage blocks for dynamically allocating data in the system, in accordance with the embodiments of the present disclosure.
FIG. 3B illustrates a block diagram of example dynamic data allocation in the virtual volume matrix of disk storage blocks as shown in FIG. 3A, in accordance with the embodiments of the present disclosure.

FIG. 3A illustrates a block diagram of an example disk drive system having a virtual volume matrix of disk storage blocks for dynamically allocating data in the system, and FIG. 3B illustrates a block diagram of example dynamic data allocation in the virtual volume matrix of disk storage blocks as shown in FIG. 3A, in accordance with the embodiments of the present disclosure. As shown in FIGS. 3A and 3B, a disk storage system 300 having a plurality of disk storage system controllers 302 and a matrix of disk storage blocks 304 controlled by the plurality of disk storage system controllers 302 may dynamically allocate data in the system. Matrix of disk storage blocks 304 may be provided to associate with physical disks. Matrix of disk storage blocks 304 may be monitored/controlled dynamically by the plurality of disk storage system controllers 302. In one embodiment, the size of each disk storage block 304 may be predefined, for example two megabytes, and the location of each disk storage block 304 may default as null. Each disk storage block 304 may be null until data is allocated. The data can be allocated in any grid of the matrix or pool (e.g., a "dot" in the grid once data is allocated in the grid). Once the data is deleted, the disk storage blocks 304 may again be available as indicated to be "null." Thus, extra and sometimes expensive data storage devices, e.g., RAID devices, can be acquired later in time on a need basis.

Accordingly, RAID 104 subsystem is capable of employing RAID techniques across a virtual number of disks. The remaining storage space is freely available. Through monitoring storage space and determining occupancy rate of the storage space of the RAID subsystem, a user may not need to acquire a large sum of drives that are expensive but have no use at the time of purchase. Thus, adding drives when they are actually needed to satisfy the increasing demand of the storage space may significantly reduce the overall cost of the disk drives. Meanwhile, the efficiency of the use of the drives may be substantially improved.

Figure 4:
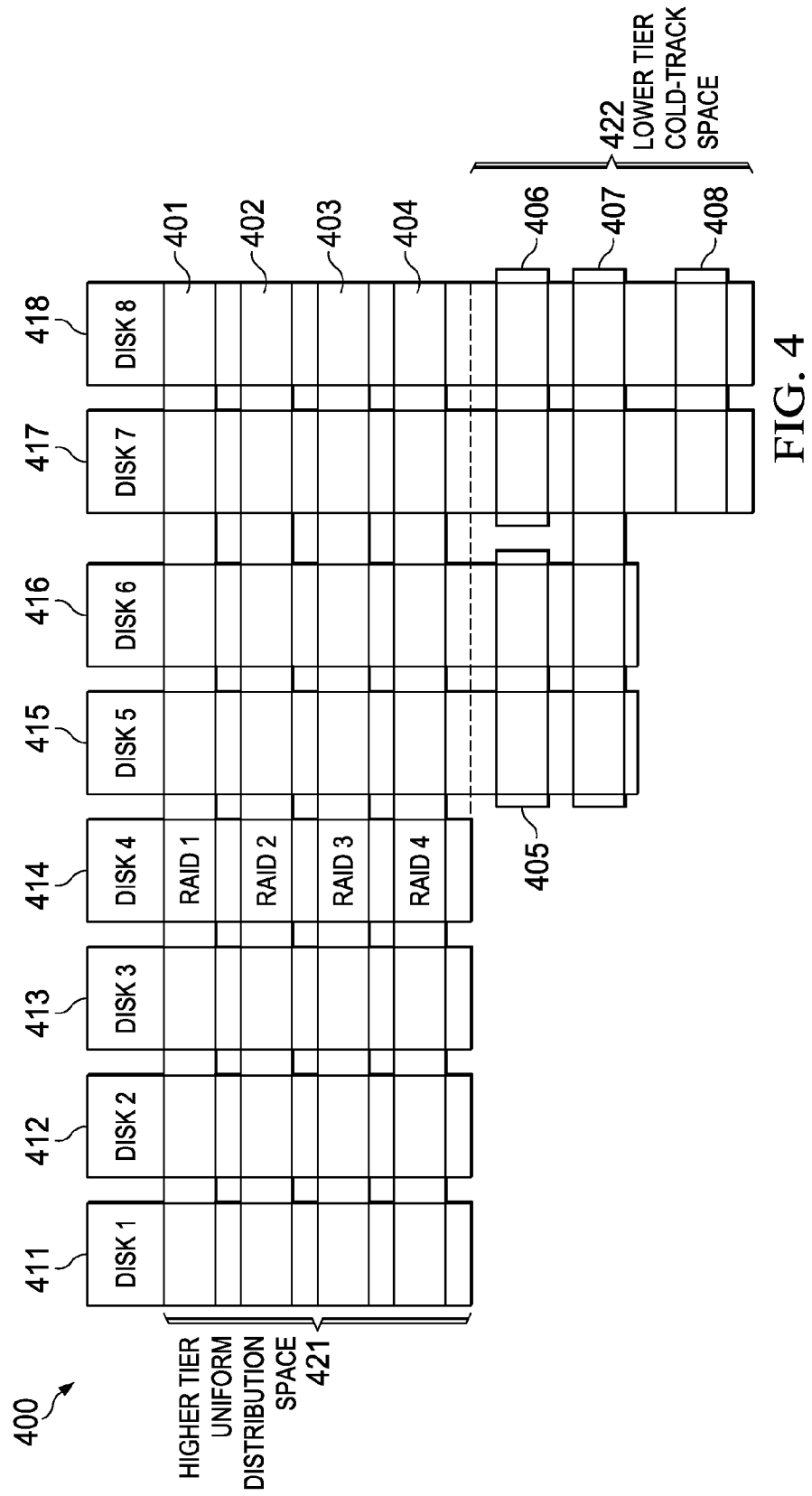
FIG. 4 illustrates a block diagram of an example data storage architecture, in accordance with the embodiments of the present disclosure.

FIG. 4 illustrates a block diagram of an example data storage architecture 400 for a particular tier of physical disks, in accordance with the embodiments of the present disclosure. As shown in FIG. 4, storage architecture 400 comprises a collection of physical disks of a tier in which four of the disks (e.g., disk 5, disk 6, disk 7, and disk 8 with reference numerals 415, 416, 417, and 418 respectively) are larger than other physical disks (e.g., disk 1, disk 2, disk 3, and disk 4 with reference numerals 411, 412, 413, and 414 respectively). Notably, disks 1-4 are all of the same size.

As shown in FIG. 4, disk manager 106 may be configured to, for a collection of physical disks of a particular tier, reduce the available amount of disk space for such tier to a higher tier uniform distribution space 421 so that a consistent (e.g., approximately equal) amount of disk space of such higher tier uniform distribution space 421 is available for all disks within the tier. Such an approach ensures an equal distribution of space for all disks of the tier and encourages an equal distribution of I/O across the disks. In addition, the extra space of those disks (e.g., disk 5, disk 6, disk 7, and disk 8) may be designated by disk manager 106 as lower-tier cold track space 422, which may be used for storage of lower-importance data (e.g., lower priority data, less-frequently accessed data) than that of higher-tier uniform distribution space 421. As a particular example, if disks 1-8 comprise solid-state storage devices designated as "tier 1" devices for storing the highest importance data, then disk manager 106 may treat higher-tier uniform distribution space 421 as tier 1 space, and lower-tier cold track space 422 as lower-tier space, such as tier 3 space for storing lower-importance data. As so designated, higher-tier uniform distribution space 421 may then be used in a tier 1 pool of storage space, from which disk manager 106 may, in conjunction with RAID subsystem 104, form RAIDs of tier 1 virtual disks (e.g., wide-stripe RAIDs 401, 402, 403, and 404 spanning all of tier 1 disks 1-8). In addition, disk manager 106 may, in conjunction with RAID subsystem 104, form RAIDs of lower tier (e.g., tier 3) virtual disks (e.g., RAIDs 405, 406, 407, 408) using lower-tier cold track space 422.

Figure 5:
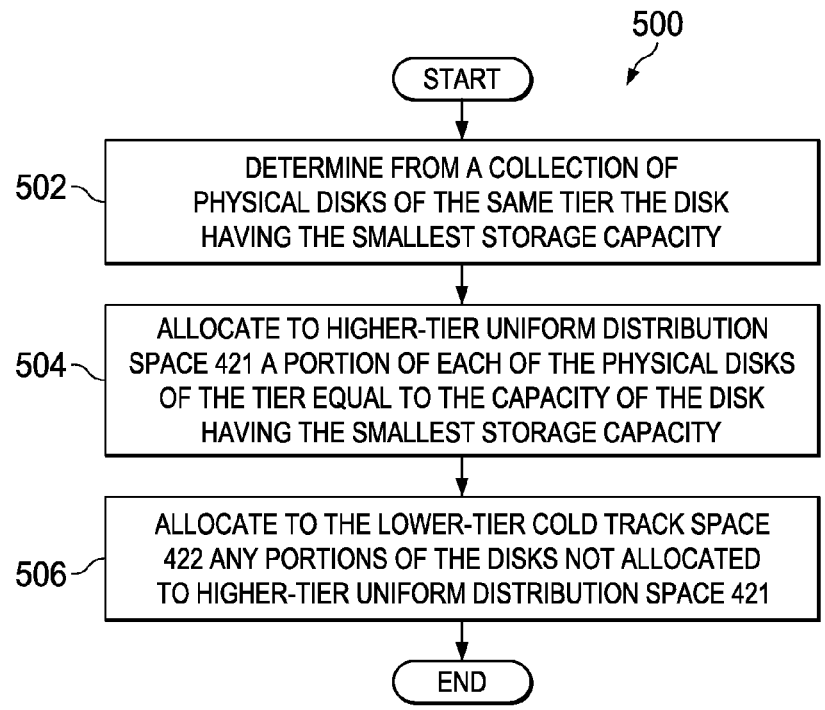
FIG. 5 illustrates a flow chart of an example method for data storage tiering using cold track tiering, in accordance with embodiments of the present disclosure.

FIG. 5 illustrates a flow chart of an example method for data storage tiering using cold track tiering, in accordance with embodiments of the present disclosure. According to some embodiments, method 500 may begin at step 502. As noted above, teachings of the present disclosure may be implemented in a variety of configurations of environment 102. As such, the preferred initialization point for method 500 and the order of the steps comprising method 500 may depend on the implementation chosen.

At step 502, disk manager 106 may determine, from a collection of physical disks of the same tier, the disk having the smallest storage capacity. For example, in the storage architecture 400 of FIG. 4, disk manager 106 may determine any of disks 1-4 to have the smallest storage capacity.

At step 504, disk manager 106 may allocate to higher-tier uniform distribution space 421 a portion of each of the physical disks of the tier equal to the capacity of the disk having the smallest storage capacity.

At step 506, disk manager 106 may allocate to lower-tier cold track space 422 any portions of the disks not allocated to higher-tier uniform distribution space 421. In some embodiments, for disks (e.g., disks 5-8) having portions allocated to both higher-tier uniform distribution space 421 and lower-tier cold track space 422, lower-tier cold track space 422 may be allocated to lower-performance tracks (e.g., internal tracks in rotating media). After completion of step 506, method 500 may end. After completion of step 506, disk manager 106 may allocate higher-tier uniform distribution space 421 to data of higher importance while allocating lower-tier cold track space 422 to data of lower importance.

Although FIG. 5 discloses a particular number of steps to be taken with respect to method 500, method 500 may be executed with greater or fewer steps than those depicted in FIG. 5. In addition, although FIG. 5 discloses a certain order of steps to be taken with respect to method 500, the steps comprising method 500 may be completed in any suitable order.

Method 500 may be implemented using environment 102 or any other system operable to implement method 500. In certain embodiments, method 500 may be implemented partially or fully in software and/or firmware embodied in computer-readable media (e.g., software and/or firmware embodying disk manager 106).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method comprising:
    allocating to a higher-tier uniform distribution space an approximately equal capacity from each of a collection of physical disks of a common storage tier, wherein a tier of a physical disk indicates an importance of data to be stored on the physical disk; and
    allocating to a lower-tier cold track space any portions of the physical disks not allocated to the higher-tier uniform distribution space.
2. The method of claim 1, further comprising:
    determining a disk of the collection of physical disks having the smallest capacity; and
    wherein allocating to the higher-tier uniform distribution space the approximately equal capacity from each of the collection of physical disks comprises allocating an amount of capacity from each of the collection of physical disks approximately equal to the smallest capacity.
3. The method of claim 1, further comprising:
    allocating to the higher-tier uniform distribution space one or more virtual disks for storing data having importance in accordance with the common storage tier; and
    allocating to the lower-tier cold track space one or more virtual disks for storing data having lower importance than data allocated to the higher-tier uniform distribution space.
4. A disk drive system, comprising:
    a RAID subsystem comprising a pool of storage; and
    a disk manager having at least one disk storage system controller configured to:
        allocate to a higher-tier uniform distribution space an approximately equal capacity from each of a collection of physical disks of a common storage tier, wherein a tier of a physical disk indicates an importance of data to be stored on the physical disk; and
        allocate to a lower-tier cold track space any portions of the physical disks not allocated to the higher-tier uniform distribution space.
5. The system of claim 4, wherein the disk manager is further configured to:
    determine a disk of the collection of physical disks having the smallest capacity; and
    allocate to the higher-tier uniform distribution space the approximately equal capacity from each of the collection of physical disks by allocating an amount of capacity from each of the collection of physical disks approximately equal to the smallest capacity.
6. The system of claim 4, the disk manager further configured to:
    allocate to the higher-tier uniform distribution space one or more virtual disks for storing data having importance in accordance with the common storage tier; and
    allocate to the lower-tier cold track space one or more virtual disks for storing data having lower importance than data allocated to the higher-tier uniform distribution space.
7. An article of manufacture comprising:
    a non-transitory computer-readable medium; and
    computer-executable instructions carried on the computer-readable medium, the instructions readable by a processor, the instructions, when read and executed, for causing the processor to:
        allocate to a higher-tier uniform distribution space an approximately equal capacity from each of a collection of physical disks of a common storage tier, wherein a tier of a physical disk indicates an importance of data to be stored on the physical disk; and
        allocate to a lower-tier cold track space any portions of the physical disks not allocated to the higher-tier uniform distribution space.
8. The article of claim 7, the instructions for further causing the processor to:
    determine a disk of the collection of physical disks having the smallest capacity; and
    allocate to the higher-tier uniform distribution space the approximately equal capacity from each of the collection of physical disks by allocating an amount of capacity from each of the collection of physical disks approximately equal to the smallest capacity.

9. The article of claim 7, the instructions for further causing the processor to:
   allocate to the higher-tier uniform distribution space one or more virtual disks for storing data having importance in accordance with the common storage tier; and
   allocate to the lower-tier cold track space one or more virtual disks for storing data having lower importance than data allocated to the higher-tier uniform distribution space.

* * * * *